(12) United States Patent
Weinberg et al.

(10) Patent No.: US 8,666,460 B2
(45) Date of Patent: Mar. 4, 2014

(54) METHOD AND APPARATUS FOR CONTROLLING A PORTABLE DEVICE

(75) Inventors: Harvey Weinberg, Sharon, MA (US); Iku Nagai, Kawasaki (JP)

(73) Assignee: Analog Devices, Inc., Norwood, MA (US)

( * ) Notice: Subject to any disclaimer, the term of this patent is extended or adjusted under 35 U.S.C. 154(b) by 1154 days.

(21) Appl. No.: 11/418,975

(22) Filed: May 5, 2006

(65) Prior Publication Data

US 2007/0268108 A1 Nov. 22, 2007

(51) Int. Cl.
*H04M 1/00* (2006.01)
(52) U.S. Cl.
USPC .......................... 455/574; 370/338
(58) Field of Classification Search
USPC ................................ 455/574, 127.5
See application file for complete search history.

(56) References Cited

U.S. PATENT DOCUMENTS

| | | | |
|---|---|---|---|
| 5,939,633 A | 8/1999 | Judy | 73/514.32 |
| 6,029,074 A * | 2/2000 | Irvin | 455/571 |
| 6,438,393 B1 | 8/2002 | Suuronen | 455/575 |
| 6,505,511 B1 | 1/2003 | Geen et al. | 73/504.12 |
| 6,912,386 B1 | 6/2005 | Himberg et al. | 455/423 |
| 2003/0003914 A1 * | 1/2003 | Kubo et al. | 455/441 |
| 2004/0181703 A1 | 9/2004 | Lilja et al. | 713/324 |
| 2005/0164633 A1 | 7/2005 | Linjama et al. | 455/41.2 |
| 2006/0119508 A1 * | 6/2006 | Miller | 342/357.17 |
| 2006/0148490 A1 * | 7/2006 | Bates et al. | 455/456.1 |
| 2006/0174685 A1 * | 8/2006 | Skvortsov et al. | 73/1.37 |
| 2006/0255139 A1 * | 11/2006 | Lee et al. | 235/439 |

FOREIGN PATENT DOCUMENTS

| | | | |
|---|---|---|---|
| EP | 1 396 940 A2 | 3/2004 | H04B 1/16 |
| WO | WO 01/99447 A1 | 12/2001 | H04Q 7/32 |

OTHER PUBLICATIONS

Authorized Officer Per Lindberg, The International Search Report and the Written Opinion of the International Searching Authority, International Application No. PCT/US2007/067395, International Searching Authority, Oct. 17, 2007, 9 pages.

* cited by examiner

*Primary Examiner* — Marcos Batista
(74) *Attorney, Agent, or Firm* — Sunstein Kann Murphy & Timbers LLP (57) ABSTRACT

An apparatus and method of managing power in a communication device determines if the communication device is moving in one of a plurality of predefined movement modes, which may be one of a first mode and a second mode. The method causes the communication device 1) to consume power at a first rate if in the first mode, and 2) consume power at a second rate, relative to the first rate, if in the second mode. The first rate is different than the second rate.

18 Claims, 5 Drawing Sheets

METHOD AND APPARATUS FOR CONTROLLING A PORTABLE DEVICE

FIELD OF THE INVENTION

The invention generally relates to portable devices and, more particularly, the invention relates to controlling operation of portable devices based upon device movement.

BACKGROUND OF THE INVENTION

Portable devices commonly are powered by an integral power source, such as a rechargeable battery. As the art adds new features and optimizes existing features, portable devices demand more power. To meet this increasing need, those in the art may simply use larger batteries. Doing this, however, is contrary to another widespread trend in modern electronics; namely, device miniaturization.

Mobile telephones illustrate this conundrum. Specifically, mobile telephones executing the well-known 3G standard generally must transmit a signal to a base station once every set time period (e.g., once about every 2.5 seconds). The purpose of this transmission is to coordinate the telephone with the appropriate cell, thus ensuring that the telephone can communicate across the cellular network. Transmitting this signal so frequently, however, drains the battery. Those in the art therefore are faced with choosing between not following this widely accepted standard (to reduce power consumption), or ensuring a large enough battery to meet the needs of the standard.

SUMMARY OF THE INVENTION

In accordance with one aspect of the invention, an apparatus and method of managing power in a communication device determines if the communication device is moving in one of a plurality of predefined movement modes, which may be one of a first mode and a second mode. The method causes the communication device 1) to consume power at a first rate if in the first mode, and 2) consume power at a second rate, relative to the first rate, if in the second mode. The first rate is different than the second rate.

The plurality of modes also may include a third mode. In that case, the method and apparatus may cause the communication device to consume power at a third rate if in the third mode. The third rate may be substantially equal to or different from the first rate.

In one illustrative embodiment, the first mode occurs when the device is not moving, while the second mode occurring when the device is moving. In some embodiments, the communication device consumes power at the first rate by generating a control signal that causes the device to transmit a transmission signal to an external device when in the first mode. In a similar manner, the communication device also may transmit the transmission signal to the external device when in the second mode. Transmission of the transmission signal in the second mode may consume more power than when in the first mode. Moreover, the transmission signal may be transmitted at a first frequency when in the first mode, and at a second (greater) frequency when in the second mode.

The communication device may have an inertial sensor that produces an inertial signal representing movement. In that case, the mode may be determined by analyzing the inertial signal. Moreover, each movement mode may have an associated set of pre-defined characteristics. Accordingly, the analysis may occur by comparing the inertial signal to each set of pre-defined characteristics. If it is not in one of the plurality of predefined movement modes, the communication device may consume power at a default rate.

In accordance with another aspect of the invention, a portable device has 1) a transmitter for transmitting a transmission signal to an external device, 2) a sensor for sensing movement of the device and producing a movement signal in response to movement of the device, and 3) a controller operatively coupled with the transmitter and the sensor. The controller analyzes the movement signal to determine if the communication device is moving in one of a first movement mode and a second movement mode. The controller controls the transmitter to transmit the transmission signal at a first frequency if in the first movement mode, and transmit the transmission signal at a second frequency if in the second movement mode. The first frequency is different than the second frequency.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing advantages of the invention will be appreciated more fully from the following further description thereof with reference to the accompanying drawings wherein.

DESCRIPTION OF ILLUSTRATIVE EMBODIMENTS

In illustrative embodiments, a method and apparatus manage power in a portable device by consuming power as a function of device movement. To that end, the method and apparatus first may determine if the portable device is moving in one of a plurality of prespecified movement modes. For example, the apparatus and method may determine that the device is moving in an automobile, or sitting on a desk. After determining the movement mode, the portable device consumes power at one of several prespecified, different rates based upon the determined mode.

Various embodiments apply to a wide variety of portable devices. For illustrative purposes, a portable communication device (i.e., a telephone) is discussed in detail below. It nevertheless should be noted that those in the art can apply those principals to other portable electronic devices, i.e., electronic devices that may be easily carried or moved, especially by hand. For example, such portable device may include a global positioning system that turns off its receiver when not moving. Those skilled in the art therefore can apply embodiments of the invention to a variety of hand-held and other portable electronic devices that can benefit from the power management features of various embodiments. Details of illustrative embodiments are discussed below.

Figure 1:
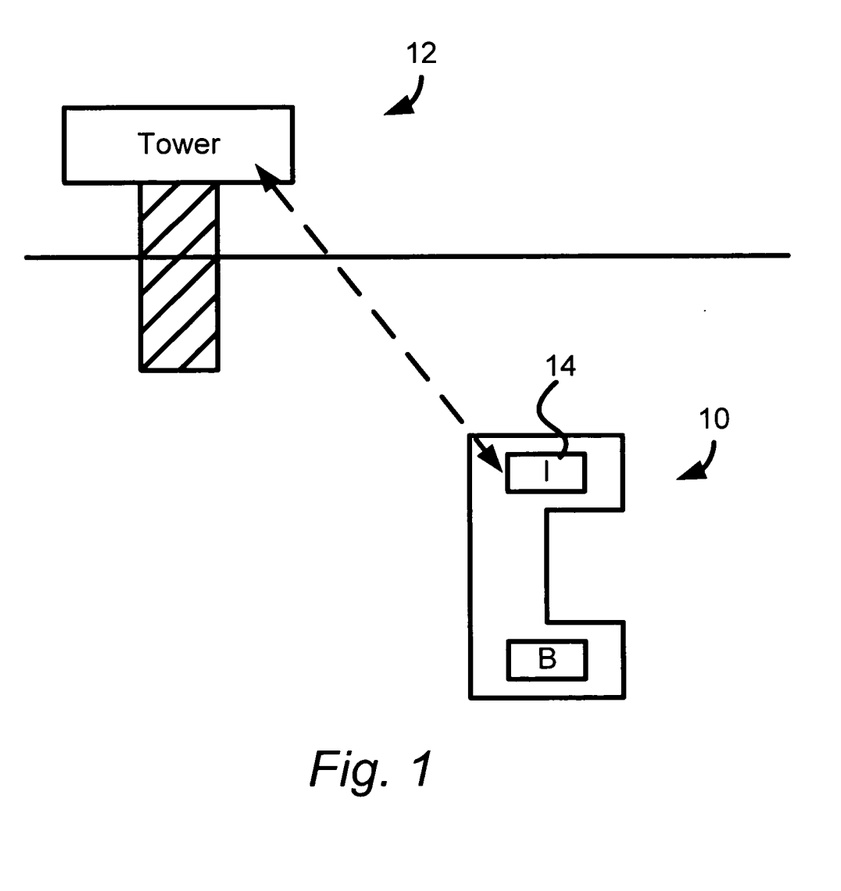
FIG. 1 schematically shows one use of a portable, handheld device that may be configured in accordance with illustrative embodiments.

FIG. 1 schematically shows one use of a portable, handheld device that may be configured in accordance with illustrative embodiments. Specifically, FIG. 1 schematically shows a mobile telephone 10 communicating with a local cell tower 12. As noted above, various mobile cellular telephone communication standards, such as the well known 3G standard, require the cellular telephone 10 to transmit a location signal once every set time period (e.g., once about every 2.5 seconds). The purpose of this location signal is to coordinate the telephone 10 with the appropriate cell tower 12, thus ensuring that the telephone 10 can communicate across the cellular network. FIG. 1 therefore schematically shows an interface 14 within the telephone 10 for transmitting such a signal, among other signals, to the tower 12.

Figure 2:
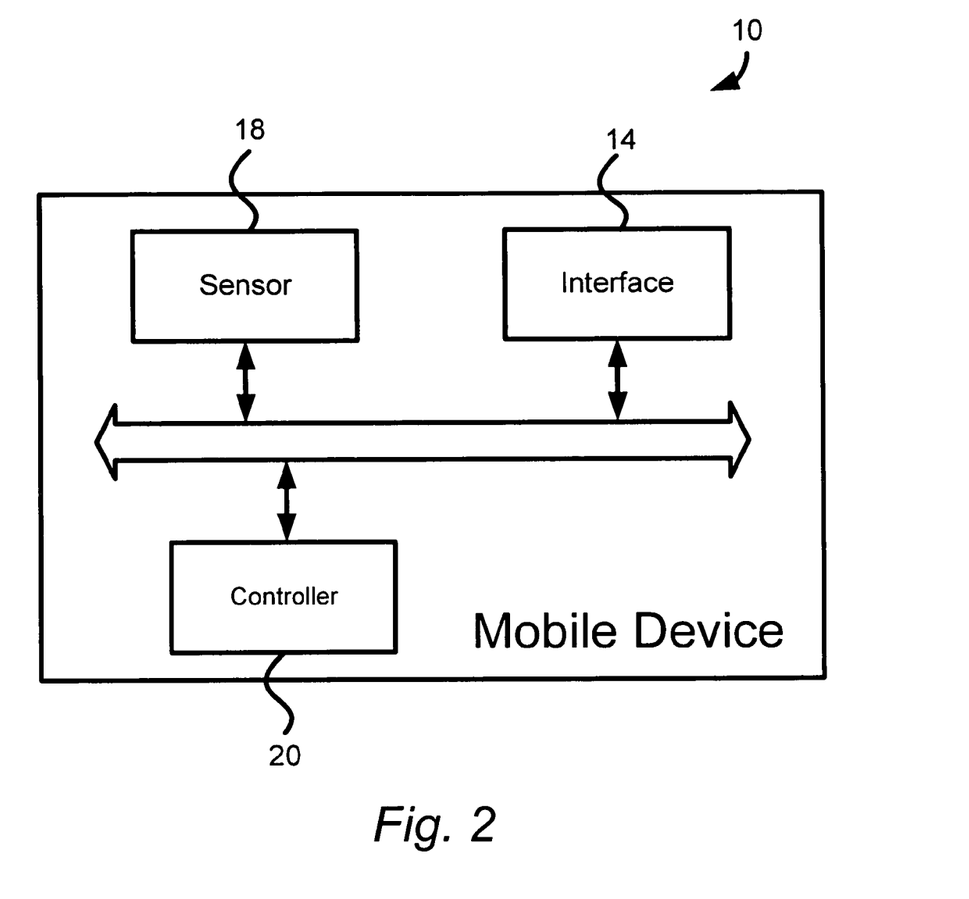
FIG. 2 schematically shows some details of a portable device that may be used as shown in FIG. 1.

The telephone 10 of FIG. 1 also includes a number of other well-known components, including a housing containing 1) the interface 14, 2) a conventional DC battery 16, 3) a transceiver (not shown), 4) a speaker (not shown) and a number of other components (see FIG. 2 for some of the additional components). As noted above, illustrative embodiments manage transmission of the location signal to more efficiently use power, thus potentially reducing the required size of the battery 16. In nevertheless should be noted that illustrative embodiments may be used with other power sources, such as AC power supplies.

Moreover, discussion of the cellular telephone 10 is illustrative and not intended to limit the scope of the invention. For example, aspects of the invention can be applied to other portable communication devices, such as a portable computing device (e.g., a portable digital assistant, or "PDA"), email receiving and transmitting device (e.g., a BLACKBERRY device, distributed by Research In Motion Limited of Waterloo, Ontario, Canada), or similar communication devices.

FIG. 2 schematically shows some additional functional components contained within the housing of the cellular telephone 10 shown in FIG. 1. Those components include an inertial sensor 18 for detecting movement of the telephone 10, a controller 20 for managing power based upon inertial signals received from the sensor 18, and the noted interface 14 for transmitting and receiving signals to and from external devices. Such external devices may be, among other things, the tower 12 shown in FIG. 1.

In illustrative embodiments, the inertial sensor 18 includes one or more MEMS accelerometers or MEMS gyroscopes. Simply stated, accelerometers typically detect linear acceleration, while gyroscopes typically detect rotational movement. Exemplary MEMS accelerometers are discussed in greater detail in U.S. Pat. No. 5,939,633, which is assigned to Analog Devices, Inc. of Norwood, Mass. Exemplary MEMS gyroscopes are discussed in greater detail in U.S. Pat. No. 6,505,511, which also is assigned to Analog Devices, Inc. of Norwood, Mass. The disclosures of U.S. Pat. Nos. 5,939,633 and 6,505,511 are incorporated herein, in their entireties, by reference.

The controller 20, which manages power in the manner described below, can be any of a number of functional components. For example, the controller 20 may be an application-specific integrated circuit ("ASIC") specially configured for the specifically noted tasks. As another example, the controller 20 may be a programmable microcontroller executing program code implementing various embodiments. In illustrative embodiments, the controller 20 is a low power electronic component (or set of electronic components), thus drawing minimal power from the battery.

Figure 3:
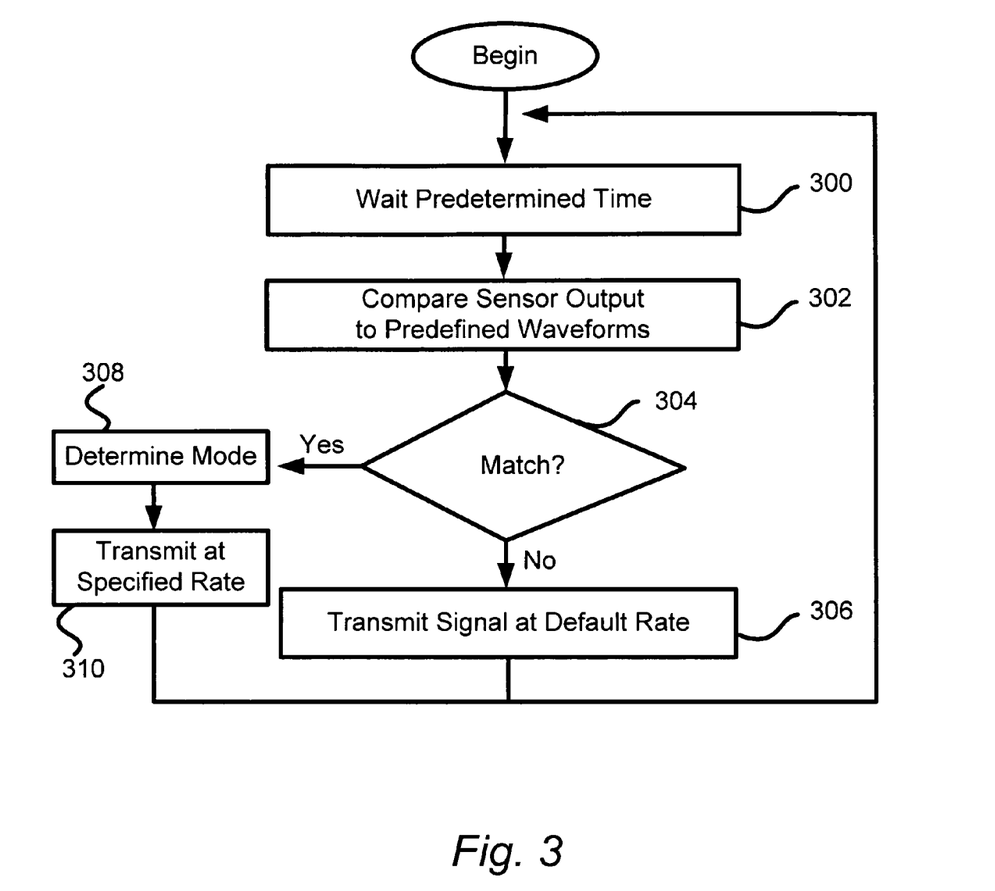
FIG. 3 shows a process a process used by the portable device of FIG. 1 to manage power in accordance with illustrative embodiments of the invention.

FIG. 3 shows a process executed by the controller 20 for managing device power in accordance with illustrative embodiments of the invention. In summary, this process determines how quickly the cellular telephone 10 of FIG. 1 is moving. If moving very slowly, the process sends a location signal to the tower 12 at a lower frequency. Consequently, because the telephone 10 is transmitting fewer location signals, it should consume less power.

To that end, the process begins at step 300, which waits a predetermined time before moving to the next step. In illustrative embodiments, this predetermined amount of time can be a function of the standard to which it is operating. For example, this predetermined time interval can be set based upon the above noted 3G standard.

After waiting for this predetermined time interval to elapse, the process continues to step 302, which compares the output of the inertial sensor 18 with a set of predefined waveforms. More specifically, as known by those skilled in the art, the inertial sensor 18 generates one or more output signals indicative of the movement of the device to which it is attached. The controller 20 receives these output signals and compares them to one of three predefined sets of waveforms.

As an example, those three predefined sets of waveforms represent 1) the device at rest, 2) the device when being held by a person is moving on his/her own power without some underlying apparatus (e.g., walking or running), and 3) the device when within a moving automobile, train, bicycle, or some other underlying apparatus. Those three predefined sets of waveforms/signatures are respectively shown in FIGS. 4A, 4B, and 4C. Each one of the three sets of waveforms represents acceleration in three orthogonal directions; namely, with respect to the x-axis, y-axis, and z-axis, where the z-axis is substantially orthogonal to the surface of the earth. The X-axis signal is identified by reference number 22, the Y-axis signal by reference number 24, and the Z-axis signal by reference number 26. Accordingly, in this case, the sensor 18 is a single accelerometer that measures acceleration along three dimensions, or multiple 1-dimension accelerometers and/or 2-dimension accelerometers.

Each of the three sets of waveforms may be derived in a conventional manner. For example, the waveforms may be derived through empirical testing, and/or based upon historical data. Thus, repeating step 302, the process compares the received inertial signals from the sensor 18 against the three sets of waveforms. This comparison may be done in a conventional manner without using integration techniques. Alternative embodiments can use integration techniques.

It should be noted that discussion of three sets of waveforms is exemplary and not intended to limit various other aspects of the invention. For example, some embodiments may use one or two sets of waveforms, while others may use four or more sets of waveforms. Accordingly, some embodiments may distinguish between or determine different numbers of movement modes, such as one mode, two modes, four modes, five modes, etc. . . .

Figure 4A:
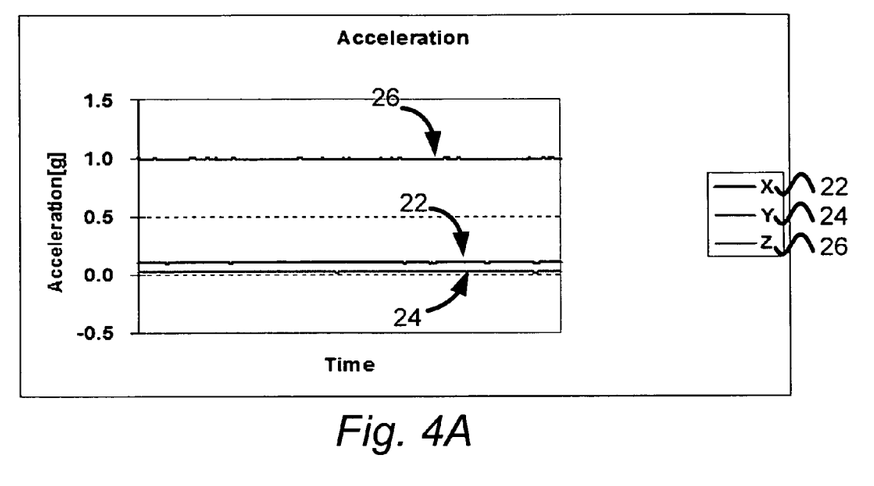
FIG. 4A schematically shows in illustrative set of anticipated waveforms produced by a 3D inertial sensor when such a sensor is not moving.
Figure 4B:
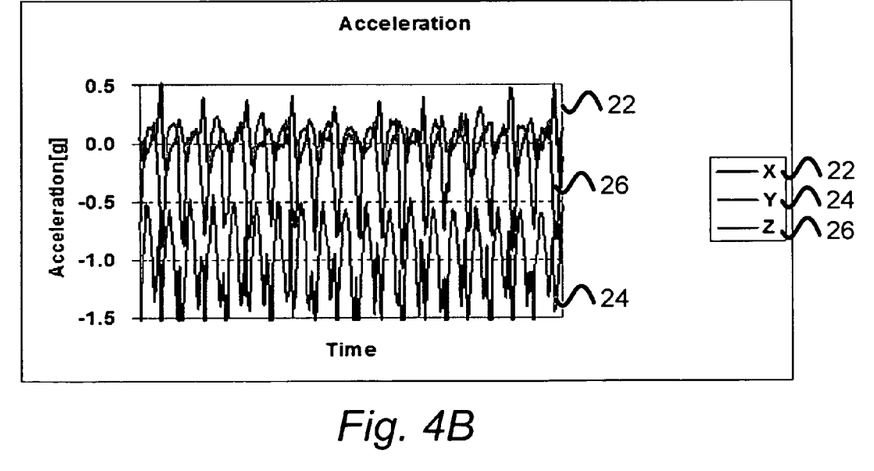
FIG. 4B schematically shows in illustrative set of anticipated waveforms produced by a 3D inertial sensor when such a sensor is held by a person who is walking.
Figure 4C:
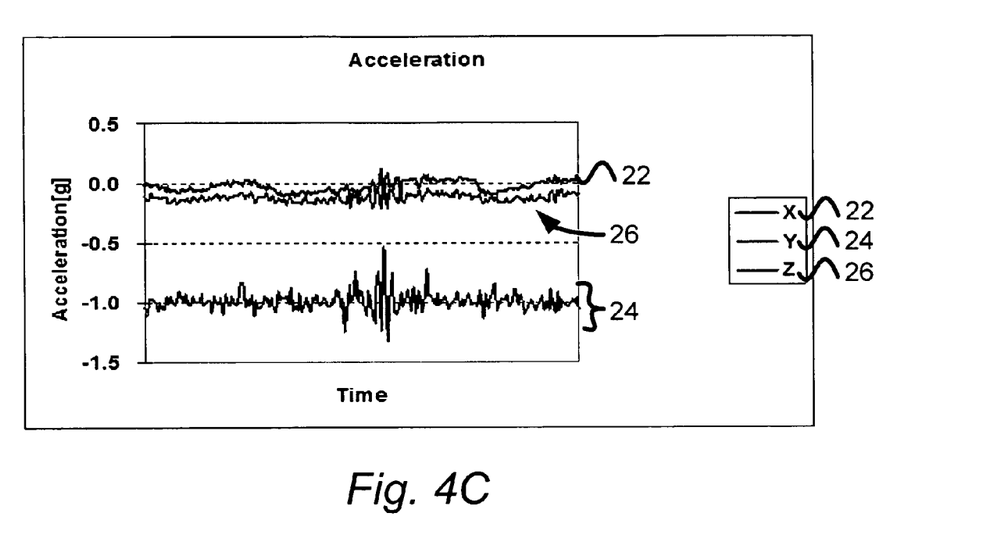
FIG. 4C schematically shows in illustrative set of anticipated waveforms produced by a 3D inertial sensor when such a sensor is within a moving automobile.

The process then determines at step 304 if the sensor signals match one of the three sets of waveforms shown in FIG. 4A, 4B, or 4C. To that end, various embodiments may compare characteristics of the sensor signals with characteristics of the three sets of stored waveforms. For example, if a given threshold about a long-term average is not exceeded during some time interval, then illustrative embodiments may infer that the telephone 10 is stationary (see FIG. 1). In a related manner, if another threshold about the long-term average is exceeded more than once per second over several seconds, it can be inferred that the telephone 10 is held by somebody walking or running (see FIG. 2). Finally, if a third threshold about the long-term average is exceeded only time to time, it is very likely that the telephone 10 is in a car, train, or other high-speed transportation mode. Of course, this latter timeframe can be determined by empirical studies or by other conventional means.

If step 304 does not yield a match, the process continues to step 306, which transmits the location signal at a default rate. For example, this default rate may be consistent with the default rate in the 3G standard.

On the other hand, if step 304 yields a match, then the process continues to step 308, which determines the mode of operation of the telephone 10. To that end, the process simply notes the set of waveforms to which it matches. For example, the process may store data identifying the matching waveforms in some temporary memory location for subsequent processing.

The process then continues to step 310, which transmits the location signal. at a prespecified rate associated with the mode determined in step 308. To that end, the method may use the prior noted mode identification data has an index to some data structure (e.g., a lookup table) to retrieve the prespecified rate. For example, this rate may be set at once per minute if the telephone 10 is not moving (FIG. 4A), or at the default rate if the telephone 10 is in a moving automobile (FIG. 4C). Continuing with this example, the rate may be set at some intermediate level, or at the default level, if held by a person who is walking (FIG. 4B). The controller 20 then may generate a control signal that, when received by logic for transmitting the location signal, modifies the appropriate transmission rate in a commensurate manner. After adjusting the rate in step 310, the process loops back to step 300, thus waiting the predetermined time.

Illustrative embodiments therefore manage device power more efficiently, thus enabling use of relatively small batteries. During use, however, it is anticipated that overall power consumption may actually increase at the same time that illustrative embodiments are minimizing power use. For example, the telephone 10 may be transmitting or receiving voice data while sitting on a desk. Accordingly, illustrative embodiments should be considered to optimize power use to the extent that location signal transmission uses battery power. Moreover, various embodiments may apply to transmission signals other than the noted location signal. In fact, some embodiments may control other devices processes, such as temporarily placing the telephone 10 in a "sleep mode" when not moving. Accordingly, discussion of the location signal is not intended to limit all aspects of the invention.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of managing power in a mobile device, the mobile device including a location sensing receiver and an inertial sensor producing an inertial signal representing movement of the device, the inertial signal characterized by an inertial signal waveform, the method comprising:
   determining if the mobile device is moving in one of at least three predefined movement modes, each movement mode characterized by a range of device velocities, the plurality of predefined movement modes including a first mode, a second mode, and a third mode;
   turning off the receiver if in a first mode; and
   turning on the receiver if in a second mode,
   wherein the device velocity is zero for the first mode and greater than zero for the second mode and a third mode, and wherein determining if the mobile device is moving in one of at least three predefined movement modes comprises determining, over a given time interval, the number of times the inertial signal waveform exceeds a threshold associated with the predefined movement mode.

2. The method as defined by claim 1 wherein the location sensing receiver is a global positioning receiver.

3. The method as defined by claim 1 wherein the inertial sensor is one of an accelerometer and a gyroscope.

4. The method as defined by claim 1, wherein determining, over a given time interval, the number of times the inertial signal waveform exceeds a threshold associated with the predefined movement mode comprises determining whether the inertial signal waveform exceeds the threshold more than once per second over several seconds.

5. The method as defined by claim 1, wherein
   determining if the mobile device is moving in one of at least three-predefined movement modes, each movement mode characterized by a range of device velocities, comprises:
   determining if the mobile device is moving in one of at least four predefined movement modes, each movement mode characterized by a range of device velocities, the plurality of predefined movement modes including a first mode, a second mode, a third mode, and a fourth mode; and wherein determining if the mobile device is moving in one of at least four predefined movement modes comprises: monitoring an accelerometer signal, and determining whether the accelerometer signal matches one of a plurality of pre-defined waveforms.

6. The method as defined by claim 1, wherein determining over a given time interval, the number of times the inertial signal waveform exceeds a threshold associated with the pre-defined movement mode includes:

determining whether the device is moving in the second mode by determining whether the inertial signal exceeds the threshold more than a first predetermined number of times over a given time interval, and determining whether the device is moving in the third mode by determining whether the inertial signal exceeds the threshold more than a second predetermined number of times over the given time interval, and wherein the first predetermined number of times is different from the second predetermined number of times.

7. A portable device comprising:

an inertial sensor producing an inertial signal representing movement of the device, the inertial signal characterized by an inertial signal waveform; and a controller operatively coupled with the sensor, the controller comparing a characteristic of the inertial signal waveform to the characteristic for each of a plurality of predefined inertial signal waveforms to determine if the portable device is moving in one of a first movement mode, a second movement mode, and a third movement mode, each movement mode characterized by a range of device velocities, wherein the device velocity is in a first range for the first movement mode and in a second range for the second movement mode, and in a third range for the third movement mode;

the controller causing transmission of a transmission signal at a first frequency if in the first movement mode, the controller causing transmission of the transmission signal at a second frequency if in the second movement mode, the controller causing transmission of the transmission signal at a third frequency if in the third movement mode, the first frequency and the second frequency being different, and the third frequency being substantially equal to the first frequency;

wherein comparing a characteristic of the inertial signal waveform to the characteristic for each of a plurality of predefined inertial signal waveforms includes determining the number of times the characteristic of the inertial signal waveform over a given time interval exceeds an average value of the characteristic for a given predetermined waveform of the plurality of predetermined waveforms.

8. The mobile device as defined by claim 7 wherein the first movement mode occurs when the device velocity is zero, the second movement mode occurring when the device velocity is greater than zero.

9. The portable device as defined by claim 7 wherein the sensor is a MEMS inertial sensor.

10. The portable device as defined by claim 7 wherein the characteristic of the inertial signal waveform is an acceleration.

11. The portable device as defined by claim 7 wherein the portable device transmits the transmission signal at a default frequency if not in one of the first and second movement modes.

12. The portable device as defined by claim 7, determining the number of times the characteristic of the inertial signal waveform over a given time interval exceeds an average value of the characteristic for a given predetermined waveform of the plurality of predetermined waveforms comprises determining whether the inertial signal waveform exceeds the average value more than once per second over several seconds.

13. The portable device of claim 7, wherein determining the number of times the characteristic of the inertial signal waveform over a given time interval exceeds an average value of the characteristic for a given predetermined waveform of the plurality of predetermined waveforms includes:

determining whether the characteristic of the inertial signal waveform exceeds the average value of the characteristic more than a first predetermined number of times over a given time interval, and determining whether the device is moving in the third mode by determining whether the characteristic of the inertial signal waveform exceeds the average value of the characteristic more than a second predetermined number of times over the given time interval, and wherein the first predetermined number of times is different from the second predetermined number of times.

14. A portable device comprising:

a location sensing receiver;

an inertial sensor producing an inertial signal representing movement of the device, the inertial signal characterized by an inertial signal waveform; and a controller operatively coupled with the sensor, the controller comparing a characteristic of the inertial signal waveform to the characteristic for each of a plurality of predefined inertial signal waveforms to determine if the portable device is moving in one of a first movement mode, a second movement mode, and a third movement mode, each movement mode characterized by a range of device velocities, wherein the device velocity is in a first range for the first mode and in a second range for the second mode, and in a third range for the third movement mode;

wherein comparing a characteristic of the inertial signal waveform to the characteristic for each of a plurality of predefined inertial signal waveforms includes determining the number of times the characteristic of the inertial signal waveform over a given time interval exceeds an average value of the characteristic in a given predetermined waveform of the plurality of predetermined waveforms, the controller turning off the receiver if in the first mode and turning on the receiver, if in the second mode or the third movement mode, wherein the device velocity is zero for the first movement mode and greater than zero for the second movement mode and the third movement mode.

15. The portable device as defined by claim 14 wherein the sensor is a MEMS inertial sensor.

16. The portable device as defined by claim 14 wherein the characteristic of the inertial signal waveform is an acceleration.

17. The portable device as defined by claim 14, wherein determining the number of times the characteristic of the inertial signal waveform over a given time interval exceeds an average value of the characteristic in a given predetermined waveform of the plurality of predetermined waveforms comprises determining whether the inertial signal waveform exceeds the average value more than once per second over several seconds.

18. The method as defined by claim 14, wherein determining the number of times the characteristic of the inertial signal waveform over a given time interval exceeds an average value of the characteristic in a given predetermined waveform of the plurality of predetermined waveforms, includes:

determining whether the device is moving in the second movement mode by determining whether the inertial signal exceeds a threshold more than a first predetermined number of times over a given time interval, and determining whether the device is moving in the third movement mode by determining whether the inertial signal exceeds the threshold more than a second predetermined number of times over the given time interval.

\* \* \* \* \*